United States Patent [19]

Bernstein

[11] 4,426,037

[45] Jan. 17, 1984

[54] BOILER FOR A HEATING SYSTEM, AS AN ARTICLE OF MANUFACTURE, A BOILER-HEATING SYSTEM COMBINATION, AND A METHOD FOR HEATING A HEAT-TRANSFER MEDIUM SUCH AS WATER IN A HEATING SYSTEM

[76] Inventor: Lennart Bernstein, Appartemento numero 29, El Pinzon Real, Guadalmina Alta, San Pedro de Alcantara (Marbella), Spain

[21] Appl. No.: 377,930

[22] Filed: May 13, 1982

Related U.S. Application Data

[63] Continuation-in-part of Ser. No. 299,175, Sep. 3, 1981, which is a continuation of Ser. No. 67,190, Aug. 17, 1979, abandoned.

[30] Foreign Application Priority Data

Aug. 24, 1978 [DE] Fed. Rep. of Germany ....... 2837004

[51] Int. Cl.³ .......................... F24D 3/08; F24H 1/22
[52] U.S. Cl. ....................................... 237/19; 122/16; 122/19
[58] Field of Search ................. 122/122, 123, 125, 37, 122/42, 43, 130, 115, 114, 169, 16, 19; 237/19, 8 R

[56] References Cited

U.S. PATENT DOCUMENTS

| | | | |
|---|---|---|---|
| 989,270 | 4/1911 | Lester et al. ........................ | 122/123 |
| 1,046,308 | 12/1912 | Kitchen ............................... | 122/114 |
| 1,152,421 | 9/1915 | Killman .............................. | 122/114 |
| 1,619,889 | 3/1927 | Scott ................................ | 122/169 X |
| 2,642,046 | 6/1953 | Alexander ........................... | 122/16 |
| 2,904,014 | 9/1959 | Meyers ............................ | 122/169 X |
| 4,136,731 | 1/1979 | DeBoer .............................. | 237/19 |
| 4,210,102 | 7/1980 | Dosmann ............................ | 237/19 |
| 4,271,789 | 6/1981 | Black ................................ | 122/16 |

Primary Examiner—Edward G. Favors
Attorney, Agent, or Firm—Pasquale A. Razzano; Fred A. Keire

[57] ABSTRACT

As an article of manufacture, a boiler for a heating system, a boiler-heating system combination, and a method for heating a heat-transfer medium such as water in a heating system; combustion gases are brought into heat-transfer contact with the heat-transfer medium over a large specific, heat-transfer surface; the heat-transfer medium flows convectionally in the opposite direction to the combustion gases and the gases are caused to flow downwardly and are thereby cooled to a temperature which is lower than the temperature at the outlet for the medium heated by the gases before the gases are discharged to atmosphere; the boiler is fired by oil and/or gas and the combustion chamber (16) is arranged immediately above one end of the smoke-pipes (22). The other end of the smoke-pipes (22) discharge into a collecting chamber (24) provided with an outlet (28) for the combustion gases. The collecting chamber (24) is provided with an outlet (34) for condensation from the combustion gases.

28 Claims, 5 Drawing Figures

BOILER FOR A HEATING SYSTEM, AS AN ARTICLE OF MANUFACTURE, A BOILER-HEATING SYSTEM COMBINATION, AND A METHOD FOR HEATING A HEAT-TRANSFER MEDIUM SUCH AS WATER IN A HEATING SYSTEM

This application is a continuation-in-part of application Ser. No. 299,175 filed Sept. 3, 1981, which in turn is a continuation of application Ser. No. 67,190 filed Aug. 17, 1979 and now abandoned.

This invention relates to a method of heating a heat-transfer medium, e.g. hot water in a central-heating system, and in particular in domestic central-heating systems, which also include a hot tap water supply system; the invention also relates to a boiler apparatus for carrying out the heating method, as well as an article of manufacture, i.e. a boiler as a replacement boiler for a tap and heating water system, or a boiler for a new installation.

Typically, modern boilers used for home heating serve two purposes, one is to heat the dwelling and the other is to supply hot tap water. Although most home heaters and tap water heaters are self-contained, various means are used to balance the demand ratio between tap water needs and heating water needs; moreover, this ratio changes with seasons.

In conventional segment boilers used in domestic hot-water central-heating installations, the fuel—which is predominantly oil or gas—is burned in a combustion chamber which extends, e.g. along the whole or partial length of the boiler. The chamber comprises a jacket in which the water—or other medium—to be heated is contained. The maximum efficiency attainable in the case of large oil-fired boilers is 87%, depending upon the nature of the fuel and the size of the boiler. The major part of the losses is represented in the relatively high heat content of the flue gases. According to present day beliefs, because of corrosion and further because of sooting of the chimney, or stack, the temperature of the flue gases at the boiler outlet-pipe should not be less than about 160° C. when the boiler is operating in the firing mode of said burner.

For the purpose of utilizing the waste heat to a better effect, it is known to enlarge the heating surface adjacent the combustion chamber by using smoke tubes (also known as flue tubes) for passing upwardly exhaust gases before these gases enter the chimney. Special measures are required in this respect to prevent sooting of the chimney as a result of condensation on the walls of the chimney due to the lowering of the temperature therein. As a result thereof, only relatively few such boilers have been used in central-heating systems.

The applicant of this invention is aware of the following art, as a result of searches in the United States Patent and Trademark Office: U.S. Pat. Nos. 989,270; 2,904,014; 1,875,828; 1,619,889; 1,421,778; 1,152,421; and 1,046,308; and the following further U.S. Pat. Nos.: 3,261,329; 3,194,217; 2,681,047; 2,886,294; 2,964,669; 2,969,047; 3,203,392; 2,086,647; 1,643,533; 1,146,566; 2,642,046; 2,937,625; 4,271,789; 4,139,055; 3,674,204; 2,151,108; 2,373,731; 2,151,108; 2,373,731; 2,904,014; 2,937,625, and 4,222,350.

In the prosecution abroad of corresponding or companion applications, the followng art has also been found: British Pat. Nos. 272,588 and 1,502,746; Published German Applications Nos. 7 014 691 and 7 606 273; German Patent Nos. 1 909 407, 915 030, and 1 933 792; French Patent No. 1 193 053, and Canadian Patent No. 105,674 (1907).

Of the above art, the following citations are being considered as relevant, but no representation is made of the relative relevance of one reference vis-a-vis the others.

U.S. Pat. No. 4,721,789, issued June 9, 1981, discloses a burner of a special construction to make use efficiently of available heat of combustion of natural gas. This burner-heater unit is fairly complex and can be distinguished on the following basis. According to the inventors, flue gases are flowing countercurrently to the heat transfer medium through appropriate conduits, for the flue gas tubes, e.g. using tube-in-tube heat exchangers, the flue gases passing in the inner tube. A particular air-combustion gas mixing is employed. Certain turbulence and surface area increasing devices are used, supposedly to achieve greater efficiencies.

In distinction from the above, the present invention relies on relatively quiescent heat transfer with at most convectional heat induced flow in a large tank in which the smoke or flue tubes are immersed, as will be further explained herein. For the present apparatus, means are employed to retain, as much as possible, relatively quiescent zones of water at different temperatures, yet in full heat transfer relationship with a combustion chamber and its smoke tubes. Moreover, while the present device describes a tap water-heating water embodiment, the prior art device appears to be highly recommended for continuous heating for only one hot (outflow) water operation, whereas the present apparatus is for intermittent use for two different water streams of two differing heat contents. The scanty disclosure in the patent of a last-mentioned embodiment illustrates no true quiescent zone separation, no control of the flue gas temperature to insure the separation of the two zones, and a serpentine flow of gases indicating a high temperature peak at the bottom and top, with a lower temperature in between, for the supposedly quiescent zones.

Similarly, no disclosure has been found which would indicate how the hot heating water is recirculated and at what temperature, or if it is for fast or slow circulation heating system. Also it seems that the heater coil corrosion problem is not addressed based on the dynamic and "at rest" states of the intermittent heat operation, whereas this aspect constitutes a significant contribution to the efficient operation of the present device.

In U.S. Pat. No. 4,222,350, a two fluid coil heater is disclosed for supplying the heating water and tap water. This heater can be characterized as a direct, short lag time demand heater. For this system, a major benefit appears to be the concept of small primary heater coils of tap water exposed to a combustion flame and relatively large volume of secondary coils being in a second tank suitable for storing heating water. Heat transfer for heating purposes is from the tap water coils to the heating coils, and not from the combustion chamber to the heating water system and from that to the tap water system as herein.

The above patent is representative of the hot coil tap water heater and heating-water boiler and many variations of the two hot water coil arrangements are found in this art, such as shown in U.S. Pat. Nos. 1,146,566; 1,643,533; 2,086,647; 2,151,108; 2,373,731; 2,642,046; 2,937,625; 3,674,204 (including electrical resistance heaters augmenting tap water); 4,203,392, etc.

Other types of dual purpose heaters, i.e. for air and water, are shown in U.S. Pat. Nos., e.g. 1,046,308, 3,033,192 and 4,139,055 (a solar heating-cooling device).

Industrial-type steam boilers are illustrated in U.S. Pat. Nos. 989,270; 1,152,421; 2,681,047; 2,86,294; 2,946,669, and 3,194,217. The last citation illustrates a highly complex apparatus entirely unsuitable for conventional family dwelling use, and while some of the elements may seem to be similar, all of the various elements in each of the combinations function differently.

An object of the present invention is to provide a method and a boiler by which the heat content of the fuel can be utilized to a much greater effect than hitherto, for a dual purpose heating water-tap water supply system having heretofore unknown structural rearrangements providing a great number of benefits, thereby increasing the efficiency of the system, without the risk of sooting of the chimney.

This object is realized by the method according to the invention, which is characterized by the fact that the gases of combustion are brought into heat-transfer contact directly in the combustion chamber and also over a large specific heat-transfer area with a heat-transfer medium, preferably water, flowing convectionally in the opposite direction to said gases, and that said gases are caused to flow downwardly and thereby cooled to a temperature beneath the temperature at the outlet for the medium, i.e. water heated by said gases before said gases are discharged to atmosphere. The heat content of the gas is absorbed by progressively cooler water which is relatively quiescent at the bottom of the device.

Thus the invention takes the formation of condensation prior to the discharge of said gases to atmosphere consciously into account, and by guiding the combustion gases downwardly prior to discharging these gases to atmosphere, provides the possibility of collecting the condensation in a deep-lying location from whence the condensates can be removed.

Conveniently, the aforementioned large, specific heat-transfer area is obtained by first positioning the firebox in an evelope of water, and then dividing the flow of combustion gas from said firebox into a multiplicity of parallel part-flows separated mechanically from the hot-water.

Further, the combustion is suitably caused to take place in a location placed immediately above the heat-transfer area, thereby to enable solid residues of combustion to be moved downwardly by the hot combustion gases such as to enable said residues to be removed together with the condensation.

In many cases—and particularly in the case of oil burners—the overpressure occurring at the burner, in combination with the suction at the chimney, is sufficient to move the combustion gases downwardly—against their natural inclination to rise upwardly—in counter-flow to the convection flow of hot-water. When necessary, however, this downward flow of the combustion gases can be assisted by an artificially induced underpressure such as a fan in the chimney.

A boiler for carrying out the method according to the invention is preferably characterized by the fact that it has the form of an upstanding tubular boiler. Conveniently, the boiler has the form of a smoke-pipe boiler in which the combustion gases are passed through the smoke pipes surrounded by the flowing heat-transfer medium—such as water. By dividing the gas flow in this way, into a large number of part flows of relatively small cross-sectional area, there is obtained a particularly effective transfer of heat to the heat-transfer medium, whereby—as a result of the counter-flow—an effective temperature gradient between the combustion gases and the heat-transfer medium is ensured along the total smoke-pipe length. The resultant condensates fall gravitationally downwardly through the smoke-pipes and can readily be removed by suction, the combustion gases leaving the boiler at the bottom thereof being maximally free of condensates.

In accordance with one advantageous embodiment of a boiler constructed in accordance with the invention, the combustion chamber is preferably arranged immediately above the upper ends of the smoke-pipes and the lower ends of said pipes discharge into a collecting chamber having an outlet for the combustion gases and a drain for the precipitation from said gases. The collecting chamber may also be provided with an outlet through which solid combustion residues can be removed. The strongly cooled—and as previously mentioned—substantially condensation-free combustion gases pass from the collecting chamber through the outlet to the chimney, from whence they are lead to atmosphere. When it is considered that the natural draft in the chimney, combined with the pressure prevailing in the combustion chamber of the boiler, will not be sufficient to draw the combustion gases downwardly, a suction fan can be arranged adjacent to or in the combustion gas outlet. In the case of oil and/or gas fired boilers, which are—as a rule—operated intermittently, the provision of such a fan will ensure that the waste gases are removed effectively from the boiler when firing of the boiler is discontinued. In the case of a boiler having an oil-burner, which is always provided with an air-supply fan, the burner may also be provided with a device arranged to operate the fan with a time-lag, said fan causing the combustion gases to be removed effectively from the boiler when the burner flame is extinguished. The benefit provided by that device is that potentially corrosive condensates are swept out from the combustion chamber and can only form, if at all, at the bottom of the smoke-tubes, in the cool regions thereof, and thus will not precipitate and corrode the combustion chamber. Also, the fresh air dilutes the combustion gases and lowers the dew point for water and acid; this eliminates corrosion in the lower regions of the smoke tubes.

The boiler, and particularly the hot-water boiler, according to the invention can be used to produce hot water for domestic use, or to produce any other household medium, i.e. service water. In accordance with a particular embodiment of the invention, to this end there is incorporated in the chamber for the heat-transfer medium, i.e. heating water, an arrangement of pipes for the household medium, i.e. tap water. Suitably, this pipe arrangement comprises an upstanding pipe-helix which is free standing or completely or partially encloses the smoke-pipes in the chamber for the heat-transfer medium, e.g. heating water, through this pipe-helix tap water can be fed. To promote the formation of the cold zone at the bottom of the heater by the fresh medium (fresh water) flowing into the helix—which medium may have a very low temperature, such as in winter, the return line for the heat-transfer medium, e.g. heating water for the slow circulation boilers, should open out into the chamber for said medium at a considerable vertical distance above the lower end of the pipe helix, and preferably at the level at which said domestic medium has reached at least substantially the same temperature as the returning heat-transfer medium.

In accordance with another advantageous embodiment of a smoke-pipe boiler constructed in accordance with the invention, the chamber for the heat-transfer medium is continued upwardly from the combustion chamber, to form thereabove a reservoir which is connected with the combustion chamber in a heat-conductive manner, the pipe-helix for said domestic medium conveniently extending into the reservoir for the heat-transfer medium. By means of this embodiment the specific heat-transfer surface between the combustion gases and the heat-transfer medium is further increased, thereby obviating the necessity of providing special heat-insulation at the top of the combustion chamber and the sides thereof. The pipe arrangement for the domestic medium, i.e. tap water, can open out into a reservoir for domestic medium located above the combustion chamber and in heat-conductive connection therewith via the heat-transfer medium, in which reservoir a relatively large amount of domestic tap water can be held at the desired temperature.

Further exemplary embodiments of the invention will now be described in more detail with reference to the accompanying schematic drawings, in which FIG. 1 illustrates one embodiment of a hot-water boiler constructed in accordance with the invention, FIG. 2 is a horizontal sectional view of the boiler, taken on a level with the combustion chamber to illustrate the distribution of the smoke-pipes;

Wherever appropriate in the Figures above, all items having common function(s) are identified with the same number.

Figure 1:
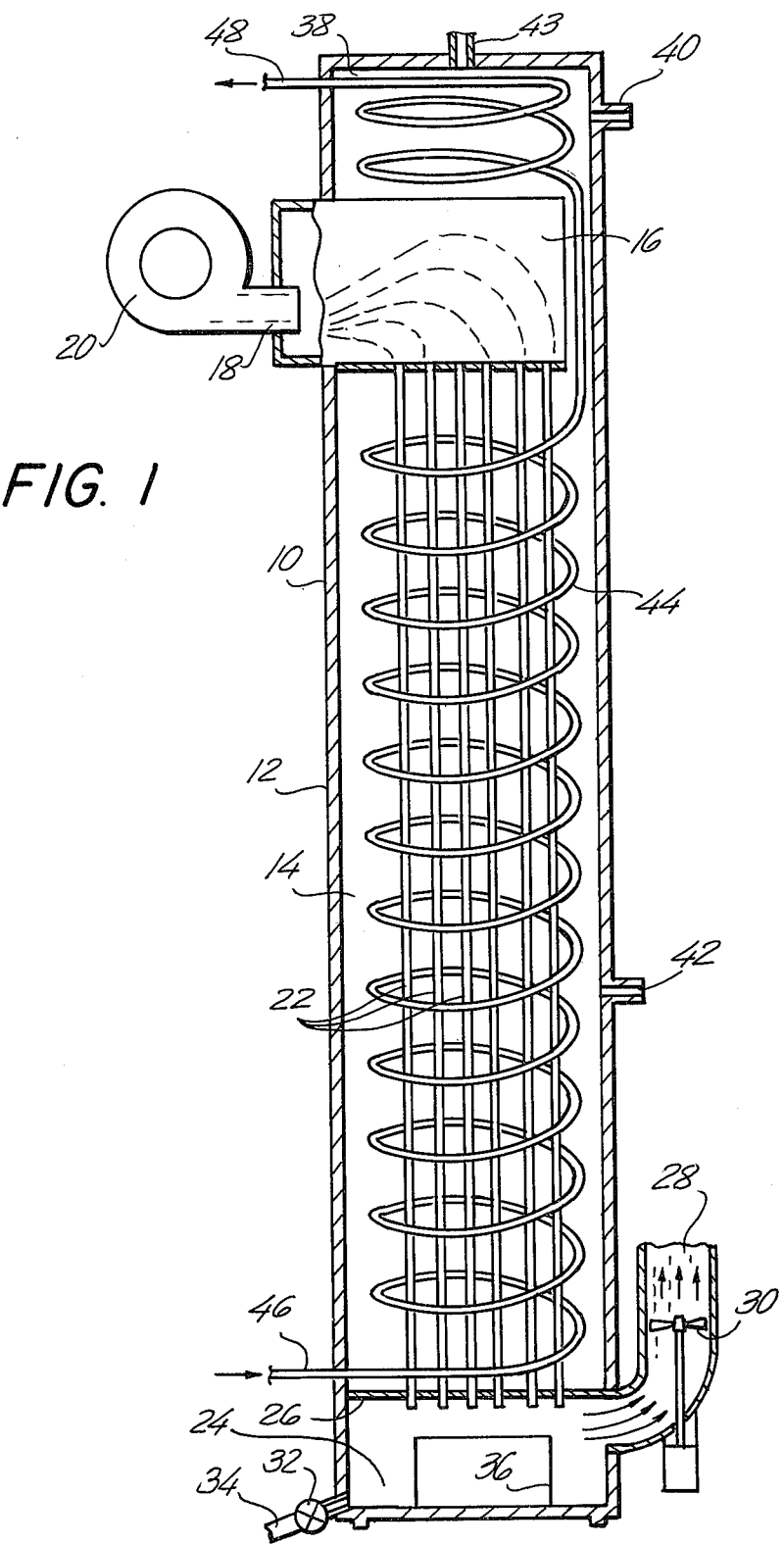
Figure 2:
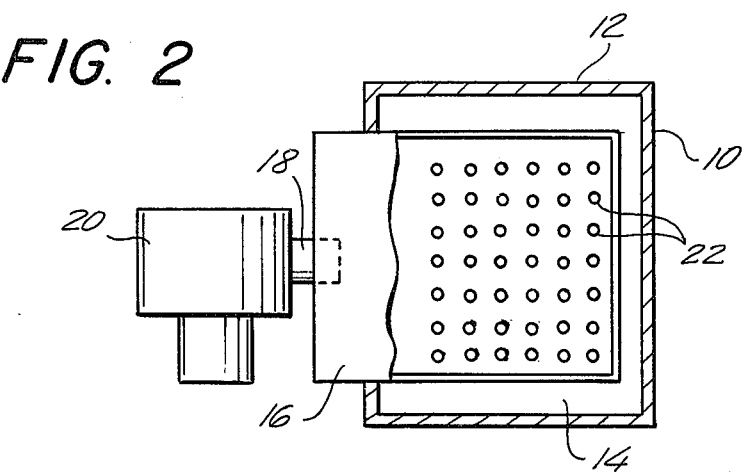

The hot-water boiler illustrated in FIGS. 1 and 2 is an oil-fired boiler comprising a boiler casing 12 having an outer insulation 10, said casing 12 enclosing a chamber 14 for a heat-transfer medium, which in the illustrated case is water. A combustion chamber 16 whose width is less than that of the casing 12 is arranged in the upper part of the casing and has an end part which projects outwardly of said casing and which houses a conventional burner 18 having a fan 20 for the combustion air. Extending downwardly from the bottom of the combustion chamber 16 and in open communication therewith and distributed evenly around said bottom, are a number of smoke-pipes 22 which pass through the hot-water chamber 14 to a collecting chamber 24 located at the lower end of the boiler casing 12, said collecting chamber being separated from the hot-water chamber 14 by a transverse wall 26.

An upwardly extending exhaust pipe 28 leads to a chimney (not shown); in the illustrated case the exhaust pipe 28 is provided with an electrically operated suction fan 30 which sucks the combustion gases from the combustion chamber 16 through the smoke-pipes 22 and the collecting chamber 24 and forces them into the atmosphere, through said chimney.

Located at the deepest part of the collecting chamber 24 is an outlet 34 provided with a valve 32, said outlet being intended for the draining of condensates precipitated in the smoke-pipes 22, such as sulphuric acid, which condensates are able to collect on the bottom of the chamber 24, from whence these can be removed by periodically opening the valve 32. Condensation residues and any combustion residues not removed through the outlet 34 can be removed through an opening 36 which is preferably arranged in one side wall of the collection chamber 24 and which is normally closed by means of a removable cover, direct access being had to said chamber by removing said cover.

As will be seen from FIG. 1, that part of the hot-water chamber 14 located above the combustion chamber 16 forms a hot-water reservoir 38 which is connected to the infeed line (hot side) of the heating system through an outlet 40. The return line (cool side) of said system is connected with the hot-water chamber 14 through an inlet 42 which is located at a considerable vertical distance above the transverse wall 26. A connecting line 43 leads to an expansion vessel, not shown.

Extending through the entire hot-water chamber 14 and chamber 38 is a helical pipe 44 intended for heating domestic water. The water is passed to the helical pipe 44 from a fresh-water line at 46 and is passed to the consumer at 48. In the lower region of the hot-water chamber 14, the helically-wound pipe 44 encircles the smoke-pipes 22 and is so dimensioned that the fresh water passed to the lower end of the helical pipe is heated to the desired temperature during its passage therethrough. In this case, the inlet for hot water returning from the water-heating system should be placed at a level such that water located in the helical pipe 44 at said level has been heated to at least substantially the temperature of the returning water.

Figure 3:
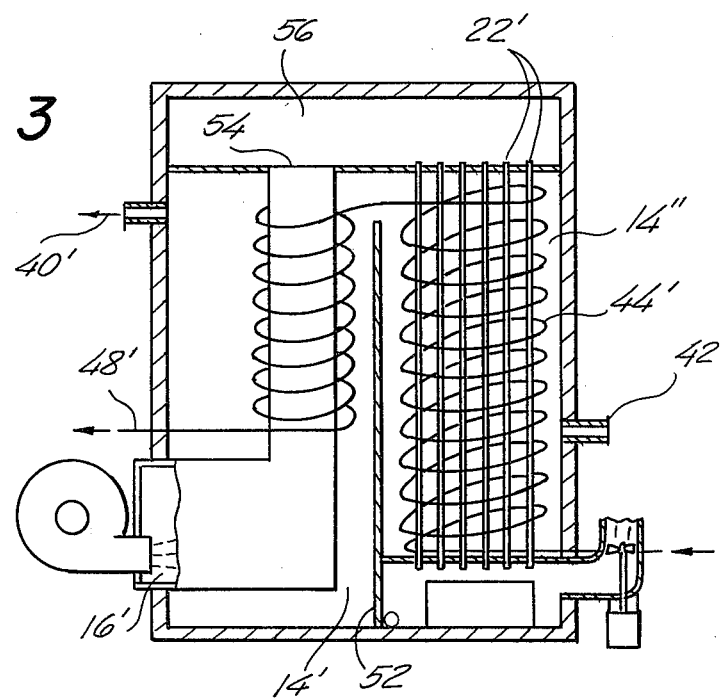
FIG. 3 is a modified embodiment of the hot-water boiler according to the invention for installation in spaces of low "ceiling" height.

FIG. 3 shows a modified hot-water boiler for installation in a space of low "ceiling" height. In the boiler of the FIG. 3 embodiment the combustion chamber 16' and the smoke-pipes 22' are arranged by the side of each other and a separate smoke intermediate-chamber is arranged above the hot-water chamber, said chamber being divided into two sections 14' and 14" by a partition wall 52. The gases from the combustion chamber 16' are first lead upwardly through a single combustion-chamber pipe 54 of relatively large cross-sectional area, to an intermediate chamber 56. The partition wall terminates at a distance beneath the intermediate chamber 56 to provide an open communication between the two hot-water chambers 14' and 14", of which chambers the one shown on the left of the drawing forms a reservoir for hot water heated by the smoke pipes 22', from which reservoir hot water is passed to the water-heating system via an outlet 40' arranged at the upper end of the boiler.

A helically wound pipe 44' is provided for domestic water, said pipe extending from the hot-water chamber 14', while encircling the combustion-chamber pipe 54, to an outlet 48' for the heated domestic water. The boiler of the FIG. 3 embodiment is similar in all other respects to the boiler of the FIGS. 1 and 2 embodiment.

Figure 4:
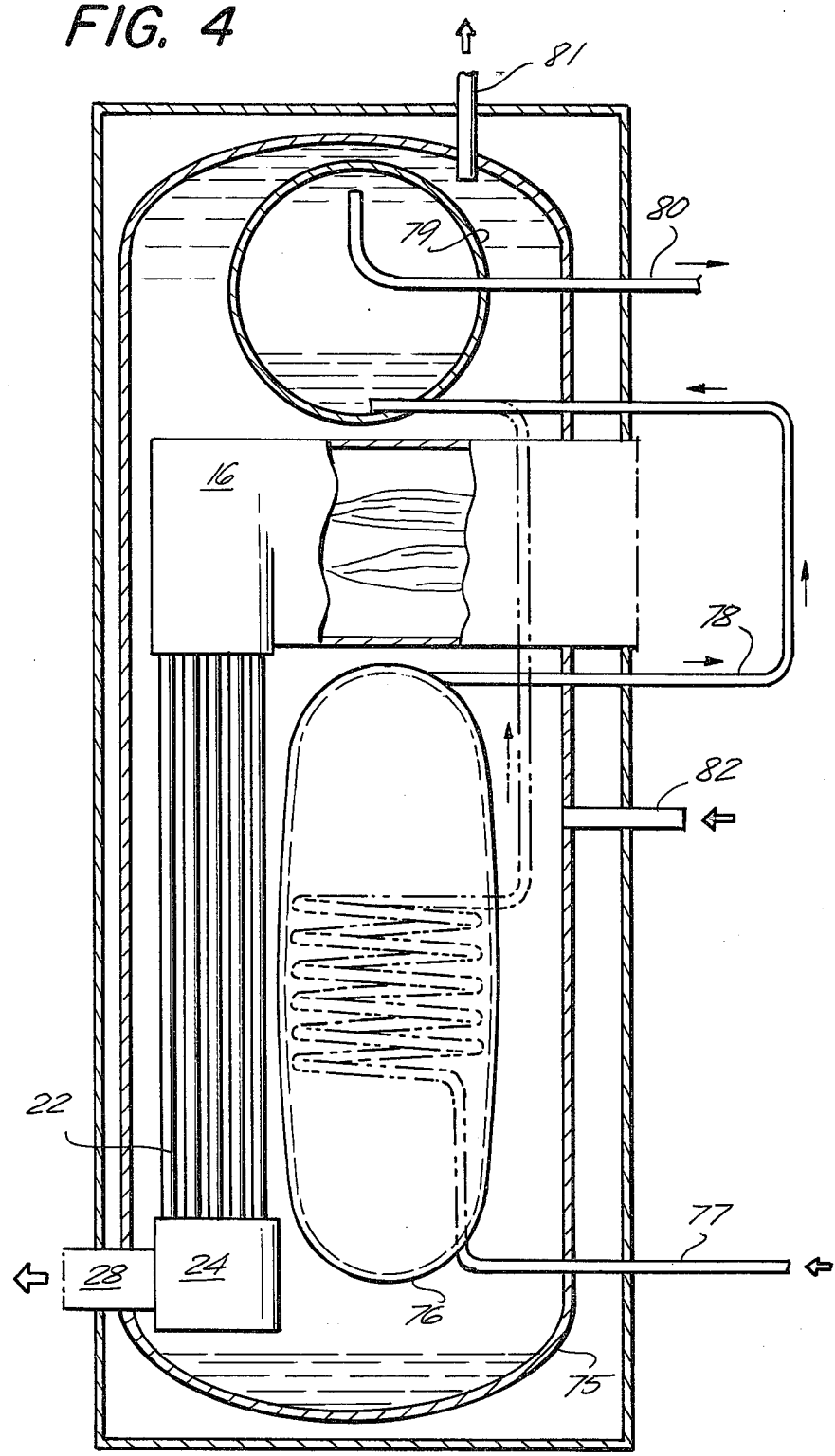
FIG. 4 is a further modification of a boiler shown in FIG. 1.

With reference to FIG. 4, it illustrates a further boiler embodiment for areas with hard water. Hard water forms incrustations on the walls of the pipe heated to temperatures above about 60° C. After a period of time, such a pipe will lose its heat conductive ability and may be completely clogged.

FIG. 4 shows a heating medium tank 75 within which a lower tap water tank 76 is placed. An inlet 77 for the same is at the bottom thereof and an outlet 78 communicates with an upper tap water tank 79 at the bottom thereof. Tap water demand is satisfied through outlet 80 communicating with the tap water distribution system. Thus only the heating water circulates to the radiators from the tank 75 via outlet 81 and returns cooled at 82. Appropriate sizing of vessels 79 and 76 based on conventional peak or average demand calculations provides tap and heating water for about any dwelling.

While the outlet-inlet conduit 78 for vessel 76 and 79, respectively, has been shown to be outside the tank 75, it also may be placed within it, i.e. in the heating medium.

By using the two interior vessel combinations, i.e. 76 and 79, an assured temperature gradient is maintained which allows the smoke pipes 22 to remain in contact with the combustion products without being seriously affected by corrosion, as further shown in the companion application Ser. No. 232,661 filed Feb. 9, 1981.

While the lower tap water vessel 76 may be in the form of a smooth walled vessel, other arrangements may be provided in lieu therefor, such as a pipe coil (not shown), a series of fin arrangements, etc. (for improving heat transfer) on the outside of the vessel 76 (not shown).

Figure 5:
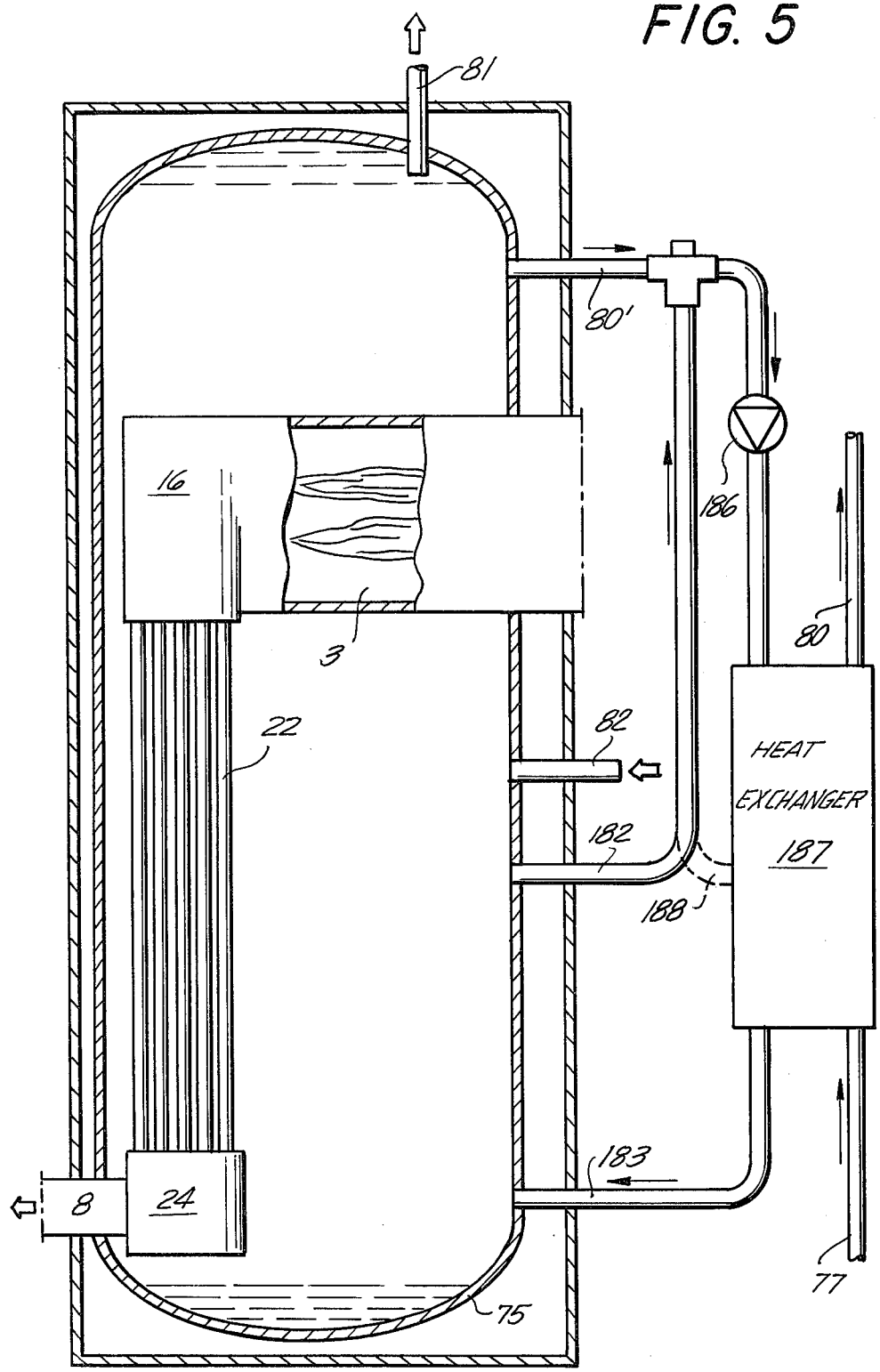
FIG. 5 is in turn a further modification of a boiler shown in FIG. 4.

With reference to FIG. 5, it illustrates an embodiment where the lower tap water tank 76 of FIG. 4 (which, in effect, is a heat exchanger) is placed outside the tank 75. Appropriate piping combinations are provided to maintain the quiescent zones in tank 75, yet at the same time be able to meet the necessary demand for hot tap water. According to this embodiment, hot heating water (heat transfer medium) at a temperature of about 70° C. to about 80° C. is removed via pipe 80' from the top of the tank 75. This hot heating water normally is removed via pipe 81 for heating purposes, but in the embodiment shown in FIG. 5, this heating water is mixed with water which is at about 50° C. maximum and which is removed via pipe 182 from the central part of tank 75. A by-pass line 188 may also supplement and/or replace water removal via pipe 182. The reasons are as follows. If the temperature of the water entering the heat exchanger 187 is above 65° C., hard water will case deposits to be formed in the heat exchanger 187. Typically, but somewhat unpredictably, hard water deposits will form at about 60° C. In order to avoid formation of these deposits, the various streams, e.g. 80', 182, and 188, are balanced such as by the means of a mixing valve 185 (and feed-back control arrangements well known in the art) so that the temperature of the cold entering water via pipe 77 is brought up from about 5° C. to about 10° C. to about 50° C. to 55° C., and the maximum temperature of 65° C. is not exceeded when the mixed water from the automatic mixing valve 185 is admitted by being pumped into the heat exchanger 187 by the pump 186. Cold return water via line 183 is taken from the heat exchanger 187 and returned to the bottom of tank 75. Typically this water has a temperature of about 25° C. to about 35° C., and it creates a cold bottom zone in the tank 75 which assures the desired temperature gradient in the tank 75. Thus, the function of the embodiment, in effect, will be the same as when the tap water is heated in the coils or tank 76 such as illustrated in FIG. 4 herein. A further advantage is that if any encrustations are formed in the heat exchanger, these encrustations may be more easily removed in an exterior heat exchanger.

Conventionally, heat exchanger 187 may be a typical pipe and header for the cold side heat exchanger and a shell for the hot side surrounding the pipes, but any other suitably desirable type of heat exchanger may be used.

As it can be seen from the above description, the benefits of the "cold bottom" boiler are multifold. Energy efficiency is improved because substantially all available heat content, i.e. latent and sensible heat, is extracted from the combustion gases during the downflow through the smoke tubes. The corrosion problem is minimized due to the corrosive conditions being avoided where damage can occur. The maximum heat exchange can occur at low flow rate in the smoke tubes because of the great number of flow tubes. The convection heat transfer outside the smoke tubes allows reasonably quiescent temperature zones being maintained, thus further avoiding corrosion while the time lag air blower in the combustion chamber 16 purges all corrosive gases from the boiler preventing corrosion in the hot upper zone while the boiler is in the substantially static state during the intermittent operation. In the dynamic state, as previously mentioned, the boiler smoke tube corrosion is minimized due to the temperature gradient which is maintained by the proper placement of the heating water return line, the cold tap water introduction line, and the convectionally transported heat in the heat transfer medium.

As a result of the above benefits, the boilers which can be sold as such as articles of manufacture can now be connected to a dwelling tap water and heating system and operated with great efficiency during the firing stage, i.e. as an apparatus without undesirable effects during the static stage for the unitary boiler-heating-tap water system.

What is claimed is:

1. As an article of manufacture, a boiler for heating a heat-transfer medium for one use and another heat transfer medium for another use, comprising:
    a combustion chamber within which combustion takes place in a direct heat transfer relationship within a heat transfer medium;
    a vessel for containing said heat transfer medium and said combustion chamber;
    an interconnecting outlet from said vessel for interconnecting a heating system with said heat transfer medium;
    an interconnecting inlet for said vessel, for interconnecting said heating system for return of said heat transfer medium to said vessel;
    a heat transfer conduit for said another heat transfer medium within said heating vessel, said heat transfer conduit having heat transfer conduit inlet and outlet interconnecting means at the lower and upper portion, respectively, of said vessel for heat transfer mediium, said inlet interconnecting means for said heat transfer conduit positioned below said combustion chamber and below said interconnecting inlet for said heat transfer medium for said heating system, and said outlet interconnecting means above said combustion chamber;
    a plurality of downcoming smoke tubes interconnecting with said combustion chamber,
    a lower chamber interconnecting with said combustion chamber via said smoke tubes and a chimney and said heat transfer conduit inlet interconnecting means proximate to said lower chamber and extending through said vessel for said heat transfer medium.

2. As an article of manufacture, a boiler for heating a heat transfer medium for one use and another heat transfer medium for another use, comprising:
- a combustion chamber within which combustion takes place in a direct heat transfer relationship within a heat transfer medium;
- a vessel for containing said heat transfer medium and said combustion chamber;
- a first partition for said vessel at the upper part thereof defining an upper smoke chamber;
- an inlet in said partition for said combustion chamber;
- a plurality of outlets for said upper smoke chamber;
- a plurality of smoke tubes interconnected with said outlets for said upper smoke chamber;
- a second partition for said vessel at the lower part thereof defining a lower smoke collection chamber interconnected with said smoke tubes and a chimney;
- a third partial partition of said vessel from a bottom of said vessel and short of the first partition, for separating said combustion chamber and said plurality of smoke tubes;
- outlet means for said heat transfer medium proximate said upper partition of said vessel;
- inlet return means for said heat transfer medium proximate said lower portions of said vessel;
- a heat transfer conduit for said another heat transfer medium within said heating vessel having a heat transfer conduit inlet and outlet interconnecting means, said inlet return means for said heat transfer medium proximate said lower portion of said vessel being above said inlet interconnecting means for said heat transfer conduit for said another heat transfer means and proximate a lower portion of said plurality of said smoke tubes;
- said outlet interconnecting means for said another heat transfer medium on a side of said partial partition and proximate said combustion chamber;
- said heat transfer conduit for said another heat transfer medium extending proximate said plurality of said smoke tubes for a length thereof across said partial partition, and proximate to said combustion chamber for a length thereof, and
- means for access to said lower smoke collection chamber.

3. A boiler as defined in claim 1 or 2 wherein said boiler is fired by oil.

4. A boiler according to claim 1 or 2 wherein said boiler is fired by gas.

5. A boiler as defined in claim 2 wherein said outlet for said collection chamber is provided with a suction fan.

6. A boiler as defined in claim 1 or 2 wherein the same is oil fired and includes an intermittently energizable oil burner provided with a venting fan, and wherein said fan includes means for operating the fan with a post-firing time lag.

7. A boiler as defined in claim 1 or 2 wherein said another heat transfer medium conduit is an upstandingly helically wound pipe which at least encircles the smoke pipes within the heat transfer medium vessel.

8. A boiler as defined in claim 1 wherein the heat transfer medium vessel extends upwardly above the combustion chamber and forms thereabove a reservoir which is in a heat-conductive connection with the combustion chamber.

9. A boiler as defined in claim 1 and wherein said another heat transfer medium conduit discharges into a domestic-water reservoir located above the combustion chamber and is in heat-conductive connection therewith.

10. The boiler as defined in claim 1 or 2 wherein said another heat transfer medium conduit is another vessel within said vessel for heat transfer medium wherein an intake conduit for said another vessel is at the bottom thereof, and an outlet conduit for said another vessel is at the top thereof and where said return line for said heat transfer medium is above said intake conduit for said another vessel, and said outlet conduit discharges into a conduit for said another heat transfer medium located above the combustion chamber and in a heat-conductive connection therewith.

11. The boiler as defined in claim 10 wherein said conduit for said another heat transfer medium is a further vessel within the vessel for the heat transfer medium where the intake line for same is said outlet conduit for said another vessel and where the outlet conduit for said further vessel is at the top thereof.

12. A boiler as defined in claims 1 or 2 and wherein a second interconnecting outlet from said vessel for a heating system heat transfer medium is interconnected to an external heat exchanger via a mixing valve means wherein said valve has at least three interconnections; a first interconnection is to said boiler; a second interconnection is to said vessel for heat transfer medium at about a central portion thereof, including a bypass return line interconnection from said heat exchanger, which bypass return line is from a hot side of said heat exchanger, and a third interconnection to a pump means for furnishing water of mixed heat content with a max temperature of ca 65° C. to avoid formations of deposits from hard water, from said mixing valve means to said heat exchanger on the hot side thereof, said heat exchanger including said bypass return line as a first outlet on the hot side thereof and as a second outlet on the hot side thereof, a return line to said vessel for heat transfer medium proximate the bottom thereof, said heat exchanger further including an inlet for a cold stream as a source for another heat transfer medium, and as a cold side outlet for said heat exchanger, a heated another heat transfer medium, such as for a tap water supply.

13. A hot tap water distribution system and heating system for a dwelling for furnishing on demand hot tap-water and heating a dwelling by means of circulating heat transfer medium from a boiler to a radiator type and the like heating means, the combination comprising:
- a combustion chamber within which fuel combustion takes place in a direct heat transfer relationship within a heat transfer medium for said heating system;
- a first vessel for containing said heat transfer medium and said combustion chamber interconnected with said heating system for said dwelling;
- an outlet from said first vessel for interconnecting said heating system with said heat transfer medium and means for circulating said heat transfer medium within said dwelling;
- an inlet for said first vessel, for interconnecting said heating system for return of said heat transfer medium from said dwelling to said first vessel;
- a heat transfer conduit for said hot tap water system within said first vessel, said heat transfer conduit for said tap water having heat transfer conduit inlet and outlet interconnecting means at the lower and upper portion of and through said first vessel, said tap water inlet interconnecting means being below said combustion chamber, below said outlet for said heat transfer medium and below said inlet for said first vessel, and said outlet for said tap water, through said first vessel, interconnecting above said combustion chamber;

a plurality of downcoming smoke tubes interconnectingly related with said combustion chamber;

a lower chamber interconnectingly related with said combustion chamber via said smoke tubes, and a chimney for said combustion chamber and said smoke tubes, and said heat transfer conduit for said tap water inlet interconnecting means being proximate to said lower chamber but within said vessel for said heat transfer medium.

14. A hot tap water distribution system and a heating system for a dwelling for furnishing on demand hot tap water and heating a dwelling by means of circulating heat transfer medium from a boiler to a radiator type and the like heating means, the combination comprising:

a combustion chamber within which fuel combustion takes place in a direct heat transfer relationship within a heat transfer medium;

a first vessel for containing said heat transfer medium and said combustion chamber;

a first partition for said vessel at the upper part thereof for defining an upper smoke chamber;

an inlet in said partition for interconnecting with said combustion chamber;

a plurality of outlets for said upper smoke chamber;

a plurality of smoke tubes interconnected with said outlets for said upper smoke chamber;

a second partition for said vessel at the lower part thereof defining a lower smoke collection chamber interconnected with said smoke tubes and a chimney;

a partial third partition of said vessel from a bottom of said vessel and short of the first partition, for separating said combustion chamber and said plurality of smoke tubes;

outlet means for said heat transfer medium proximate said upper partition of said first vessel interconnected with said heating system for said dwelling;

inlet return means for said heat transfer medium proximate said lower portions of said first vessel interconnected with said heating system for said dwelling;

means for circulating said heating medium to said boiler;

a heat transfer conduit for said tap water within said first vessel having a heat transfer conduit inlet and outlet interconnecting means, said inlet return means for said heat transfer medium proximate said lower portion of said vessel, but above said inlet interconnecting means for said heat transfer conduit for said tap water and proximate a lower portion of said plurality of said smoke tubes;

outlet interconnecting means for said tap water on a side of said partial partition proximate said combustion chamber, and said heat transfer conduit for said tap water extending proximate said plurality of said smoke tubes for a length thereof and across said partial partition, and proximate to said combustion chamber for a length thereof.

15. A hot tap water and heating system as defined in claim 13 or 14 wherein said boiler is fired by oil.

16. A hot tap water and heating system as defined in claims 13 or 14 wherein said boiler is fired by gas.

17. A hot tap water and heating system as defined in claim 13 or 14 wherein said outlet for said collection chamber is provided with a suction fan.

18. A hot tap water and heating system as defined in claim 13 or 14 wherein the same is oil fired and includes an intermittently energizable oil burner provided with a venting fan, and wherein said fan includes means for operating the fan with a post-firing time lag.

19. A hot tap water and heating system as defined in claim 13 or 14 wherein said tap water conduit is an upstandingly helically wound pipe which at least encircles the smoke pipes within the heat transfer medium vessel.

20. A hot tap water and heating system as defined in claim 13 or 14 wherein the heat transfer medium vessel extends upwardly above the combustion chamber and forms thereabove a reservoir which is in a heat-conductive connection with the combustion chamber.

21. A hot tap water and heating system as defined in claim 13 or 14 wherein said tap water conduit discharges into a domestic-water reservoir located above the combustion chamber and is in heat-conductive connection therewith.

22. A hot tap water and heating system as defined in claim 13 or 14 wherein said hot tap water conduit is a second vessel within said first vessel wherein an intake conduit for said second vessel is at the bottom thereof, and an outlet conduit for another vessel is at the top thereof and where said return line for said heat transfer medium is above said intake conduit for said second vessel, and said outlet conduit discharges into a conduit for said tap water located above the combustion chamber and in a heat-conductive connection therewith.

23. A hot tap water and heating system as defined in claim 22 wherein said conduit for said tap water is a third vessel within the first vessel for the heat transfer medium where the intake for same is said outlet conduit for said second vessel and where the outlet conduit for said third vessel is at the top thereof and interconnected with said hot tap water system.

24. A method for providing tap water and heat to a dwelling comprising the steps of:

firing intermittently a fuel in a combustion chamber zone within a heat transfer medium for said dwelling, contained in a vessel zone;

conducting downwardly through a plurality of smoke pipe zones combustion products including smoke during firing of said fuel;

collecting said smoke and combustion products in a collection chamber zone;

expelling said gaseous combustion products through a chimney;

collecting other combustion products in said collection zone for disposal of same;

heating said heat transfer medium in said vessel for said heating of said dwelling;

circulating said heat transfer medium when needed within said dwelling by removing said heat transfer medium proximate an upper part of said vessel zone and returning said heat transfer medium in a reintroducing zone between said collection chamber zone and combustion chamber zone;

introducing tap water at a position below said recirculating heat transfer medium reintroducing zone but proximate said collection chamber zone;

heating an adequate supply of said tap water by heat transfer from said heat transfer medium in tap water heating zone in relationship to a graduated convectional heating of said heat transfer medium below and above said combustion chamber, and withdrawing upon demand said tap water from the top of said vessel zone containing said hot tap water.

25. The method as defined in claim 24, including purging combustion products from said combustion chamber zone by post-firing air purging of said combustion chamber.

26. The method as defined in claim 24, including inducing draft in said chimney.

27. The method as defined in claim 24 wherein the fuel is oil or gas.

28. The method as defined in claim 24 wherein the heat transfer medium at the bottom of said vessel zone around said collection chamber zone is relatively cold with respect to the zone surrounding said combustion chamber zone, and maintaining relatively quiescent convection associated heat transfer in said heat transfer medium.

* * * * *